United States Patent
Church

[15] 3,671,804
[45] June 20, 1972

[54] VARIABLE DUTY CYCLE SWTICHING CIRCUIT

[72] Inventor: Richard D. Church, Candor, N.Y.

[73] Assignee: American Standard Linear Systems, Inc., Candor, N.Y.

[22] Filed: June 25, 1970

[21] Appl. No.: 49,802

[52] U.S. Cl..............................315/127, 315/219, 321/18, 321/45 R, 323/22 T, 331/113 A
[51] Int. Cl..........................................................G05f 1/58
[58] Field of Search...................315/94, 105, 106, 119, 127, 315/129, 206, 219, 200 R; 321/2, 18, 45 R, 47; 331/113 A, 66, 108 R; 323/18, 22 T, 38

[56] References Cited

UNITED STATES PATENTS

| | | | |
|---|---|---|---|
| 2,954,531 | 9/1960 | Johnson | 331/113 A |
| 2,968,738 | 1/1961 | Pintell | 323/22 T |
| 2,989,686 | 6/1961 | Pinckaers et al. | 323/22 T |
| 3,183,430 | 5/1965 | Schonholzer | 321/47 |
| 3,223,909 | 12/1965 | Sensing et al. | 323/22 T |
| 3,229,158 | 1/1966 | Jensen | 315/159 X |
| 3,310,727 | 3/1967 | Flannery | 321/2 X |

*Primary Examiner*—A. D. Pellinen
*Attorney*—Bean & Bean

[57] ABSTRACT

A magnetically coupled multivibrator is normally prevented from running free due to the presence of a forwardly biased transistor which holds the base electrode of one of the two multivibrator transistors below its level of base-emitter conduction. A variable current source charges a capacitor to a voltage level which cuts off the holding transistor and allows the multivibrator circuit to operate for one cycle, during the latter part of which cycle the capacitor is dumped so that the successive cycles are separated in time by that time necessary to charge the capacitor to the required level and which time is variable according to the charging current. The variable duty cycle thus obtained for the multivibrator circuit controls a voltage or power source whose output is fed back inversely to control the charging current so that a regulated voltage or power output is produced.

16 Claims, 4 Drawing Figures

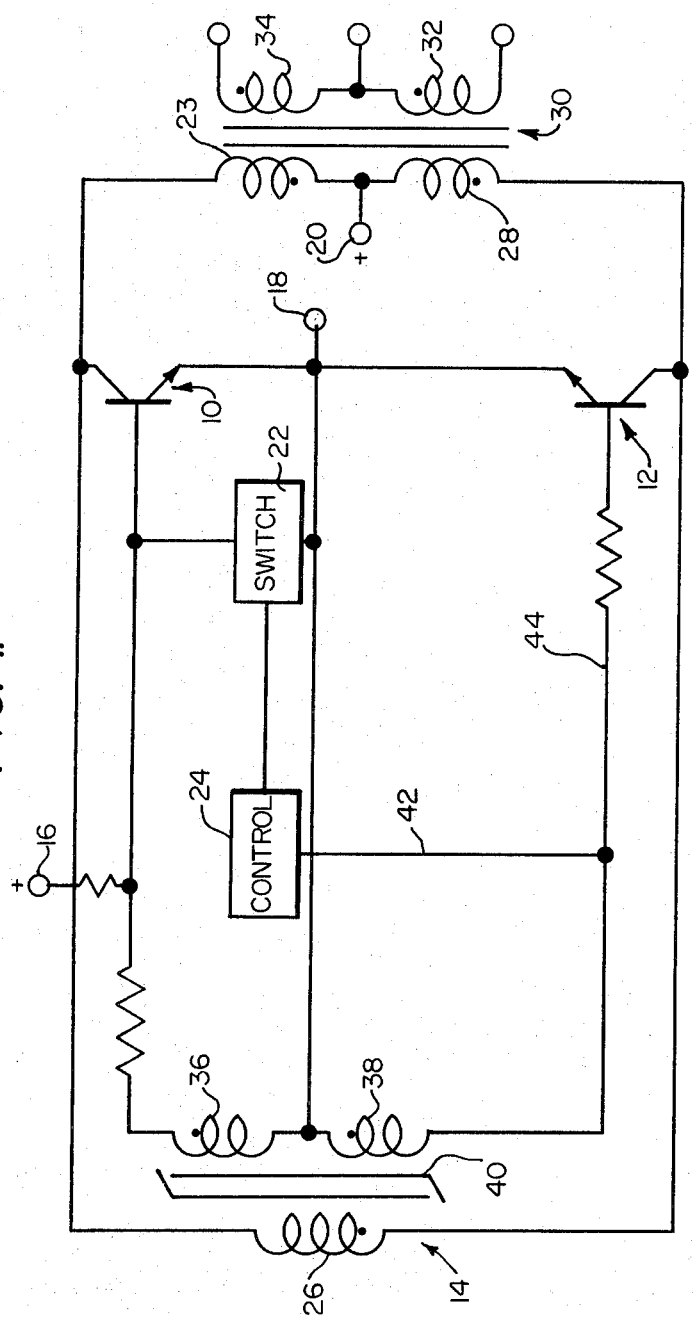
FIG. I.
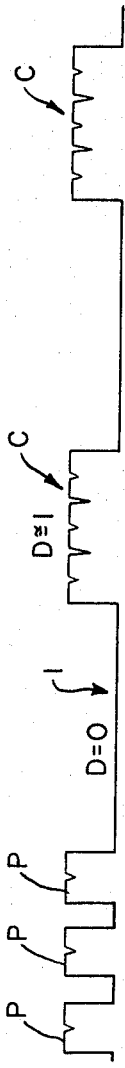
FIG. 4.
INVENTOR
RICHARD D. CHURCH
BY
*Bean & Bean*
ATTORNEYS

INVENTOR
RICHARD D. CHURCH

VARIABLE DUTY CYCLE SWTICHING CIRCUIT

BACKGROUND AND BRIEF SUMMARY OF THE INVENTION

The system according to this invention essentially involves the use of a pair of semiconductor devices inductively coupled by means of a saturable core transformer and forming a multivibrator biased in such a fashion as would normally render it free running. By simple control circuitry, however, the multivibrator is allowed to perform only one cycle at a time, the control circuitry being variable in its control to permit the duty cycle of the multivibrator output to vary between 0 and nearly 100 percent. Thus, the system may be used linearly to control the voltage and/or current applied to a load from zero to near maximum.

Variable duty cycle arrangements are known, as for example those described in U.S. Pat. Nos. 2,813,244 and 3,223,909, as well as references cited and referenced therein and, as well, saturable core magnetically coupled multivibrators are known for power supply control, for example, see U.S. Pat. No. 2,848,614. However, variable duty cycle arrangements normally rely upon some means for controlling pulse width to obtain the duty cycle variation and, in general, tend to require rather complex circuitry, whereas regulated power supplies employing saturable core multivibrators also tend toward complexity and require filtering arrangements.

According to the present invention, a pair of transistors operating in conjunction with a saturable core transformer form a multivibrator, and a control circuit arrangement connected thereto imparts an operation to the circuit which has the characteristics of a monostable binary device. By controlling the periodicity of the triggering action on this monostable circuit, variable time separation between successive cycles of action is achieved which allows the system when used as a power control to obtain a duty cycle which may be varied linearly between zero to nearly unity.

The multivibrator control involves a combination of a variable current source and a capacitor charged thereby. Charging of the capacitor to some predetermined voltage level triggers the multivibrator action for a cycle, the latter part of the cycle being used to control a dumping switch for the capacitor so as to obtain the monostable characteristic. By using feedback to control the current source, a regulated power output control is obtained.

BRIEF DESCRIPTION OF THE DRAWINGS

FIG. 1 is a simplified diagram illustrating basic principles according to the present invention;

DETAILED DESCRIPTION OF THE INVENTION

Figure 2:
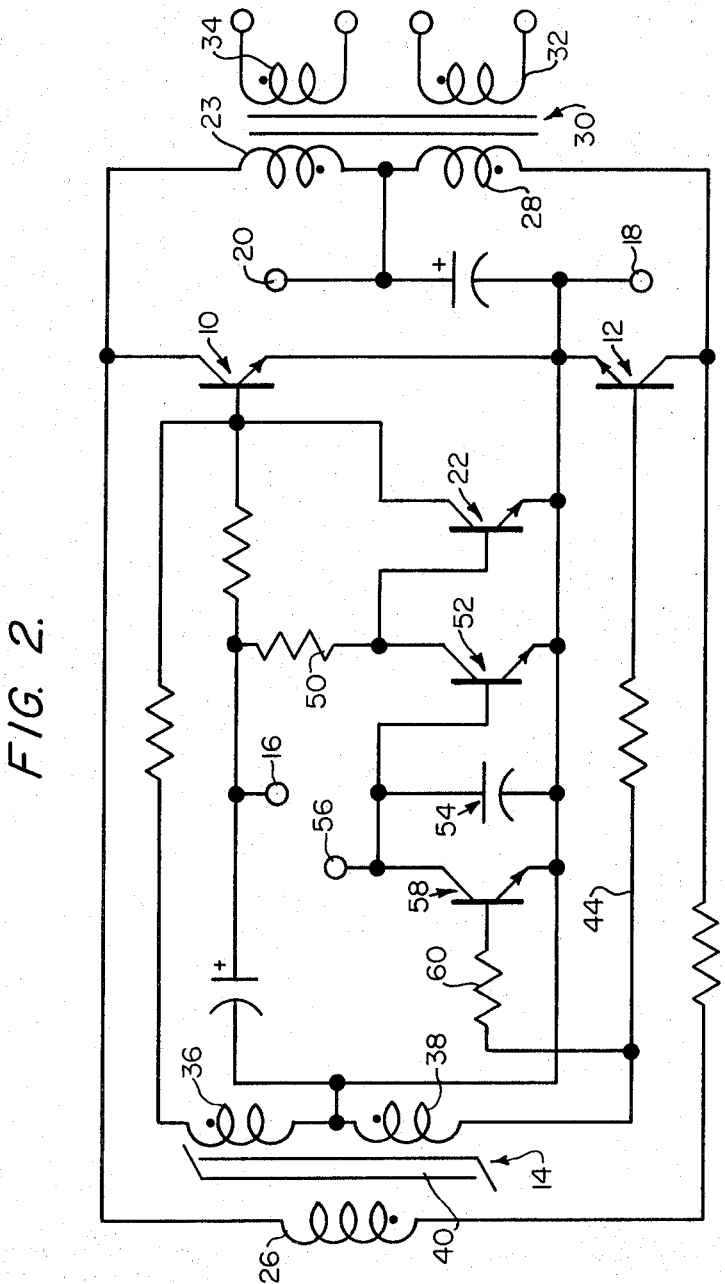
FIG. 2 is a circuit diagram showing a preferred embodiment of FIG. 1.

The diagrammatic illustration of FIG. 1 will illustrate the principles according to the present invention. As shown, a pair of semiconductor switching devices indicated generally by the reference characters 10 and 12 are connected to a saturable core transformer indicated generally by the reference character 14 in such a manner that by virtue of the biasing of the base-emitter junction of the switching device 10 across the terminals 16 and 18, this switching device will tend to conduct collector current from the terminal 20 and through the winding 23 to the terminal 18 which, as will be described hereinbelow, would otherwise initiate free running of the multivibrator. A switch 22 or clamping device, however, is provided normally to hold the base electrode of the switching device 10 at the potential of the terminal 18 thereby preventing operation of the multivibrator circuit. This holding or clamping switch 22 is under the control of a circuit 24 which operates periodically to disable the switch 22 and thus allow the switch 10 to conduct collector current.

When the switch 10 conducts collector current, which is caused by current through the winding 26 of the saturable core transformer 14 and through the winding 23 of transformer 30 and the load on the windings 32 and 34 being reflected to the winding 23, the dot polarity on the winding 23 becomes positive and the collector-emitter voltage of the switching device 10 approaches a saturation value. At the same time the dot polarity of the saturable core transformer 14 is also positive so that the winding 36 reinforces the base-emitter current of the switching device 10 to assure that it is securely conducting collector current and, at the same time, the winding 38 produces negative voltage on the base-emitter junction of the switching device 12 so that it may not conduct collector current.

It will be appreciated that the core 40 of the saturable core transformer is constructed of essentially rectangular hysteresis loop material so that the voltage on the winding 26 remains essentially constant as a function of time until the volt-second product of the core material 40 has been satisfied such that the voltage on the winding 26 then decreases and passes through 0 volts ultimately to become of negative dot polarity. This established a reversal of current through the windings 36 and 38 causing the switching device 10 to terminate conduction of collector current and forcing the switching device 12 to commence conduction of collector current. The control circuit 24 is connected by conductor 42 to the control conductor 44 on the switching device 12 so that when the latter is biased at its base electrode to conduct collector current, the control circuit 24 operates to close the switching device 22 thereby preventing a second cyclic operation of the multivibrator device.

Within the above framework, it will be appreciated that the transformer 30 may control a load system to provide for example a power input thereto which is a function of the periodicity to which the multivibrator circuit is excited to conduct successive cycles of operation. Therefore, if the control circuit 24 is actuated to excite the multivibrator circuit in an increasingly rapid manner, the duty cycle of its output will approach unity. Of course, if the control system 24 does not allow operation of the multivibrator circuit the duty cycle will be zero so that, by proper control, the multivibrator may be operated between a zero duty cycle characteristic and a duty cycle characteristic which approaches unity.

To understand better the characteristics of the system shown diagrammatically only in FIG. 1, reference is had at this time to the circuitry shown in FIG. 2. The reference characters utilized for the circuit components described in conjunction with FIG. 1 are used, wherever possible, in the circuitry of FIG. 2. In FIG. 2, the holding switch 22 will be seen to take the form of a transistor having its collector electrode connected to the base electrode of the switching device 10 and having its emitter electrode connected to the common terminal 18 and its base electrode is connected through the resistor 50 to the terminal 16. The control circuitry 24 includes the transistor 52, the capacitor 54 and a variable current source (not shown) connected to the terminal 56, and a dumping switch 58 having its collector-emitter path connected in parallel with the capacitor 54 and having its base electrode biased through the resistor 60 from the conductor 44.

The operation of the device has been described thus generally in connection with FIG. 1. In quiescent condition, since the collector-emitter saturation voltage of the switch 22 is less than the threshold voltage of the base-emitter of the switching device 10, the holding switch 22 will pass collector current so as to hold the switch 10 in off condition. Current from a variable current source hereinafter described is applied at the junction 56 so that the voltage on the capacitor 54 begins to rise, it being appreciated that the initial condition of the capacitor 54 will prevent collector current from being passed by the switch 52 and, likewise, the base electrode of the dumping switch 58 is biased to prevent collector current from being conducted by this dumping switch. As soon as the voltage across the capacitor 54 has reached some predetermined value, the switch 52 will conduct collector current which, causing a voltage drop across the resistor 50, will cause the switch 22 to cease conduction of collector current, thereby allowing the switch 10 to pass collector current and thereby initiate a cycle of operation as previously described. During the second half of the cycle of operation, that is, when the switching device 12 is biased to pass collector current, the dumping switch 58 likewise is biased to pass collector current which will shunt the capacitor 54 so as to dump the charge thereon and allow the voltage thereacross to drop so that the switching device 52 no longer conducts collector current. As a result, the switch 22 will once again conduct and prevent the second cycle of operation from occurring until the voltage across the capacitor 54 has once again risen to that predetermined value which allows the switch 52 to pass collector current. Thus, it will be evident that the time separation between successive cycles of operation of the multivibrator device will depend upon the time required for the capacitor 54 to store a current charge causing the voltage thereacross to achieve the aforementioned predetermined value which closes the switching device 52. Thus, by providing a variable current to the terminal 56, the duty cycle of the circuitry of FIG. 2 can be controlled.

Figure 3:
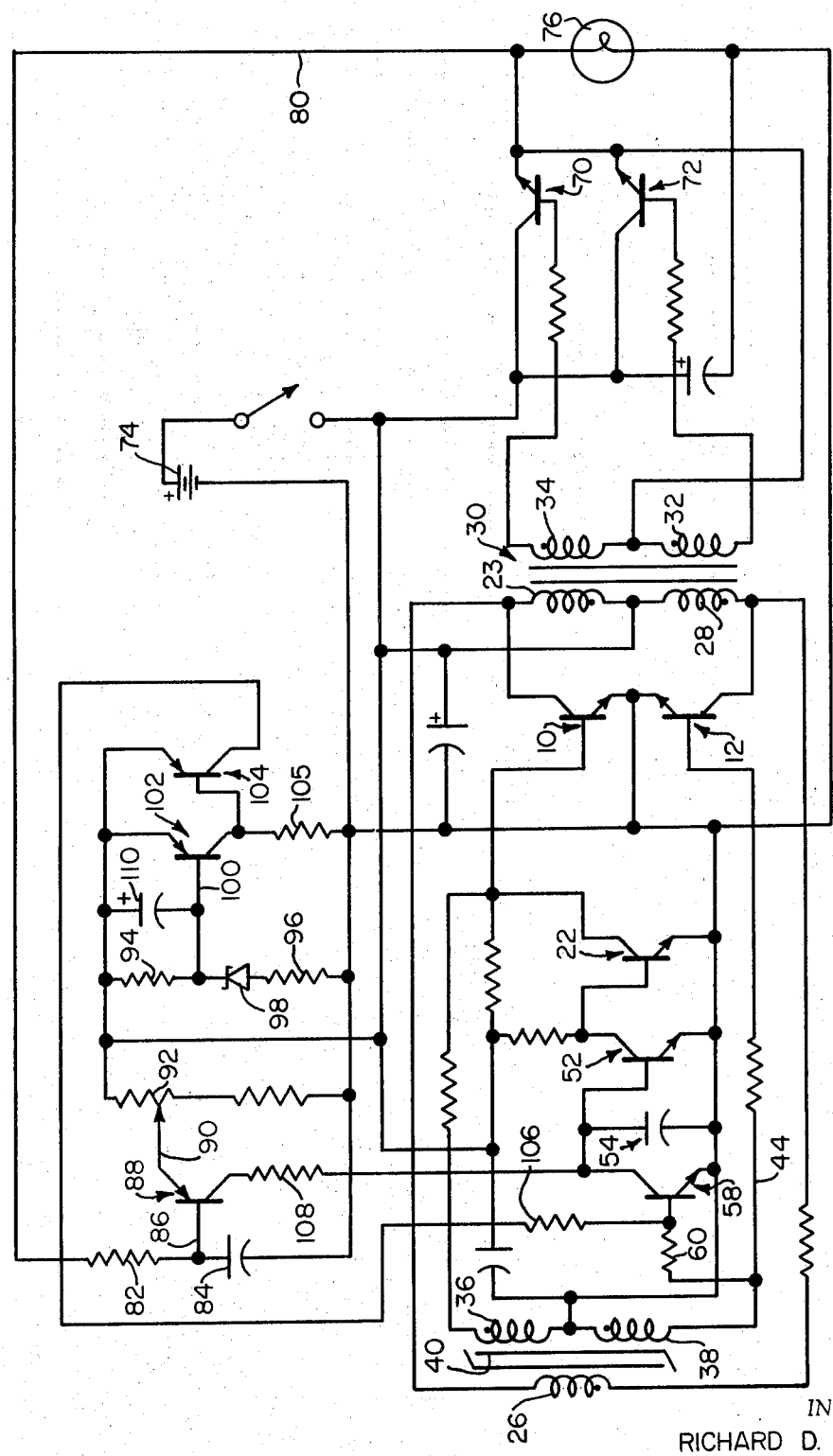
FIG. 3 is a circuit diagram showing the use of the circuit of FIG. 2 as an unfiltered voltage regulator; and, FIG. 4 is a form diagram showing certain principles of the invention.

To illustrate a practical embodiment of the invention as thus far described, reference is had to FIG. 3 which shows an unfiltered voltage regulator system. From FIG. 3, it will be appreciated that the output of the transformer 30 across its windings 32 and 34 is used alternately to control the semiconductor switches 70 and 72 whereby to allow current to flow from the source 74 to the load 76 alternately through the switches 70 and 72 during each cycle of operation of the multivibrator device described in conjunction with FIG. 2. The voltage output is fed back over the conductor 80 to supply current to an integrating circuit comprising the resistor 82 and the capacitor 84 connected in series as shown and the juncture between which is connected to the base electrode 86 of a current-supplying transistor 88 whose emitter electrode is connected to the moveable tap 90 of a voltage dividing resistor 92 connected across the voltage of the supply 74. Positioning of the movable tap 90 controls the power output to the load 76 since the transistor 88 will conduct current for charging the capacitor 54 inversely with respect to the output voltage at the conductor 80.

The invention as shown in FIG. 3 may be used to provide a particularly useful hand-held variable intensity lantern in which, as shown, the output load 76 is a suitable light source. The D.C. power supply 74 may be in the form of rechargeable nickel-cadmium batteries. The entire device may be of very light weight so as to provide an extremely portable light source whose intensity may be varied over a wide range. The characteristics of conventional nickel-cadmium batteries allow for prolonged high-intensity illumination whereas the intensity control allows the light source to be operated at whatever level is required at the moment. Thus, by providing a manual control for the movable tap 90, the operator may reduce the intensity level to be no greater than that which is required at one instant, thereby reducing the drain on the batteries, while at the same time being able instantly to increase the intensity to obtain the amount of illumination required by changing circumstances. Military, underwater and fire fighting uses are examples of those uses to which the device may be put with advantage.

For this application of the circuit, it is desirable to prevent the voltage of the battery supply 74 from dropping below a predetermined level and, to this end, a protecting circuit is used in the FIG. 3 embodiment. This circuit is not normally operative but will respond to modify the action when the voltage of the supply drops below a predetermined value.

This function is achieved by the resistor chain 94, 96 and intervening zener diode 98, the values of the resistors 94 and 96 being such that above some predetermined voltage level of the supply 74, the zener diode 98 will conduct current but will not conduct below the voltage value. The value of the resistor 94 is chosen such that with the diode 98 conducting, the voltage at the base electrode 100 of the transistor 102 allows this transistor to be in saturation whereby the emitter-base of the transistor 104 is not forward biased due to the drop across the resistor 105. As a consequence, no collector current flows through the transistor 104 and the resistor 106 and the dumping switch 58 operate as is described above.

However, should the voltage of the supply 74 drop to that value which will not sustain conduction of the zener diode 98, the transistor 102 is cut off and the emitter base of the transistor 104 is now forward biased through the resistor 105. The resultant current through the resistor 106 due to collector current conduction of the transistor 104 causes part of the supply current through the resistor 108 to the capacitor 54 to be shunted by the transistor 58 so that the voltage build up across the capacitor 54 cannot reach that value sufficient to forward bias the transistor 52. As a result, the duty cycle of the system is abruptly decreased to zero.

The resulting decrease in power output from the battery supply 74 allows its output voltage to increase until the zener diode 98 again conducts thereby to cut off the transistor 104. With only those circuit components thus far described, the protection circuit operates to modify the normal duty cycle as a function of the threshold value below which the zener diode 98 will not conduct and in effect decreases the duty cycle otherwise established by the setting of he movable tap 90.

In view of the fact that the efficiency of the device is greater when operating at a higher duty cycle, the capacitor 110 is included in the protective circuit to allow the device to operate for several cycles at maximum duty cycle before the transistor 104 is turned on due to cessation of current conduction through the zener diode 98.

The effect of the capacitor 110 is best explained in connection with FIG. 4. In this figure, normal operation is represented by the first three pulses P each of whose durations represents the successive "on" times for the two switches 70 and 72 and which represents one cycle of the device, the "off" times between these pulses being controlled by the setting of the movable tap 90. During this normal operation, the voltage of the supply has decreased below that value which allows conduction through the zener diode 98 so that after the capacitor 110 has discharged sufficiently through the resistor 94, the transistor 102 will cease conduction so that the transistor 104 is turned "on" to produce the interval I (zero duty cycle) as described above. During this interval, the switches 70 and 72 do not conduct and the voltage across the capacitor 84 decrease- whereas the voltage at the source 74 increases to exceed the threshold for the diode 98. As a result of the decrease of voltage across the capacitor 84, the transistor will increase its conduction toward saturation so that when the supply voltage exceeds the threshold of diode conduction and the transistor 104, with delay, is turned off, the device will run at a cluster of cycles of maximum duty cycle D, as indicated by the pulse cluster C which will terminate when the supply voltage drops below the conduction value for the diode 98 and, with delay, turns the transistor 104 on.

What is claimed is:

1. A variable duty cycle switching circuit comprising, in combination,
 a saturable core transformer having first and second windings and a saturable core inductively coupling said windings,
 a pair of oppositely poled switching transistors having their emitter-collector paths connected in series across the opposite ends of said first winding and having their base electrodes connected to respective opposite ends of said second winding,
 impedance means comprising a third winding connected across the opposite ends of said first winding,
 D.C. supply means having one side connected to a point intermediate the ends of said third winding and its other side connected between the ends of said second winding and to the juncture between said emitter-collector paths of said transistors, said one side of said supply means also being connected to the base electrode of one transistor normally to forward bias same to conduct collector current and produce a voltage drop in one direction across said first winding through said impedance means, said first and second windings being of dot polarity first to reinforce the forward bias of said one transistor and then to reverse dot polarity to forward bias the other transistor whereby to initiate successive cycles of successive actuations of said transistors, control means connected to said one transistor normally preventing forward biasing of same, said control means including variable means for selectively varying the periodicity with which said one transistor is forward biased, and said variable means comprising a capacitor, a variable current source for charging said capacitor, and a dumping switch for said capacitor actuated in consonance with forward biasing of said other transistor.

2. The variable duty cycle switching circuit according to claim 1 wherein said impedance means comprises the primary winding of a transformer, said transformer having a secondary winding, and power switching means controlled by said secondary winding.

3. The variable duty cycle switching circuit according to claim 2 wherein said variable current source is controlled by said power switching means.

4. An electrical system comprising a load, a D.C. power supply for said load, and means for selectively varying the power supplied to said load, the improvement wherein:

said means comprises a variable duty cycle switching circuit for controlling the connection of said power supply to said load, said variable duty cycle switching circuit including a saturable core transformer having first and second windings and a saturable core inductively coupling said windings, a pair of oppositely poled switching transistors having their emitter-collector paths connected in series across the opposite ends of said first winding and having their base electrodes connected to respective opposite ends of said second winding, impedance means comprising a third winding connected across the opposite ends of said first winding, one side of said power supply being connected to a point intermediate the ends of said third winding and the other side of said power supply being connected between the ends of said second winding and to the junction between the emitter-collector paths of said transistors, said one side of the power supply being also connected to the base electrode of one transistor normally to forward bias same to conduct collector current and produce a voltage drop in one direction across said first winding through said impedance means, said first and second windings being of dot polarity first to reinforce the forward biasing of said one transistor and then to reverse dot polarity to forward bias the other transistor whereby said switching circuit tends to operate in successive cycles of successive actuation of said transistors, and control means connected to said one transistor normally preventing forward biasing of same, said control means including variable means for selectively varying the periodicity with which said one transistor is forward biased by said power supply, said variable means comprising a capacitor, a variable current source for charging said capacitor, and a dumping switch for said capacitor actuated in consonance with forward biasing of said other transistor.

5. The electrical circuit according to claim 4 wherein said impedance means comprises the primary winding of a transformer, said transformer having a secondary winding, and power switching means controlled by said secondary winding.

6. The electrical circuit according to claim 5 wherein said variable current source is controlled by the output to said load.

7. An electrical system comprising a load, a D.C. power supply for said load, and means for selectively varying the power supplied to said load, the improvement wherein:

said means comprises a variable duty cycle switching circuit for controlling the connection of said power supply to said load, said variable duty cycle switching circuit including a saturable core transformer having first and second windings and a saturable core inductively coupling said windings, a pair of oppositely poled switching transistors having their emitter-collector paths connected in series across the opposite ends of said first winding and having their base electrodes connected to respective opposite ends of said second winding, impedance means comprising a third winding connected across the opposite ends of said first winding, one side of said power supply being connected to a point intermediate the ends of said third winding and the other side of said power supply being connected between the ends of said second winding and to the junction between the emitter-collector paths of said transistors, said one side of the power supply being also connected to the base electrode of one transistor normally to forward bias same to conduct collector current and produce a voltage drop in one direction across said first winding through said impedance means, said first and second windings being of dot polarity first to reinforce the forward biasing of said one transistor and then to reverse dot polarity to forward bias the other transistor whereby said switching circuit tends to operate in successive cycles of successive actuation of said transistors, and control means connected to said one transistor normally preventing forward biasing of same, said control means including variable means for selectively varying the periodicity with which said one transistor is forward biased by said power supply, said load being an illuminating bulb and said power supply being nickel-cadmium battery means, and a protective circuit means responsive to the voltage of said battery means for abruptly decreasing the duty cycle of the switching circuit in the event that the voltage of the supply drops below a predetermined level.

8. The electrical circuit according to claim 7 wherein said protective circuit means includes means for periodically operating said switching circuit in maximum duty cycle pulse clusters.

9. The electrical circuit according to claim 8 wherein said variable means comprises a capacitor, a variable current source for charging said capacitor, and a dumping switch for said capacitor actuated in consonance with forward biasing of said other transistor.

10. The electrical circuit according to claim 9 wherein said impedance means comprises the primary winding of a transformer, said transformer having a secondary winding, and power switching means controlled by said secondary winding.

11. The electrical circuit according to claim 10 wherein said variable current source is controlled by the output to said load.

12. The electrical circuit according to claim 7 wherein said variable means comprises a capacitor, a variable current source for charging said capacitor, and a dumping switch for said capacitor actuated in consonance with forward biasing of said other transistor.

13. The electrical circuit according to claim 12 wherein said impedance means comprises the primary winding of a transformer, said transformer having a secondary winding, and power switching means controlled by said secondary winding.

14. The electrical circuit according to claim 13 wherein said variable current source is controlled by the output to said load.

15. The electrical circuit according to claim 7 wherein said impedance means comprises the primary winding of a transformer, said transformer having a secondary winding, and power switching means controlled by said secondary winding.

16. A variable duty cycle switching circuit comprising, in combination, a saturable core transformer having a first and second winding;
a first normally open semiconductor switching device connected to one end of said second winding;
a second normally open semiconductor switching device connected to the other end of said second winding;
biasing means connected to both of said semiconductor devices, said first winding being connected at its opposite ends to respective ones of of said semiconductor devices whereby said biasing means tends to initiate successive cycles of successive actuation of said semiconductor switching devices;
control means connected to said first semiconductor switching device normally preventing said biasing means from closing same, said control means including variable means for selectively varying the periodicity with which said first semiconductor switching device is permitted to close;
said variable means comprising a capacitor, a variable current source for charging said capacitor, and a dumping switch for said capacitor actuated in consonance with closing of said second semiconductor switching device.

* * * * *